United States Patent
Sanagi et al.

(10) Patent No.: US 7,687,162 B2
(45) Date of Patent: Mar. 30, 2010

(54) PURGING METHOD OF FUEL CELL SYSTEM

(75) Inventors: Yoshihisa Sanagi, Saitama (JP); Yuji Nagata, Tokyo (JP); Motohiro Takahashi, Kanagawa (JP); Takayuki Kaneko, Kanagawa (JP); Naoki Kanie, Kanagawa (JP); Masahiro Ogawa, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1141 days.

(21) Appl. No.: 10/470,779

(22) PCT Filed: Jan. 29, 2002

(86) PCT No.: PCT/JP02/00646

§ 371 (c)(1),
(2), (4) Date: Jan. 5, 2004

(87) PCT Pub. No.: WO01/97312

PCT Pub. Date: Dec. 20, 2001

(65) Prior Publication Data

US 2004/0115488 A1    Jun. 17, 2004

(30) Foreign Application Priority Data

Jan. 31, 2001    (JP)    ................................ 2001-024854

(51) Int. Cl.
*H01M 8/04* (2006.01)

(52) U.S. Cl. ........................................... 429/13; 429/23

(58) Field of Classification Search .................... None
See application file for complete search history.

(56) References Cited

U.S. PATENT DOCUMENTS

| 4,537,839 | A  * | 8/1985  | Cameron ........................ 429/20 |
|-----------|------|---------|----------------------------------------|
| 5,648,182 | A    | 7/1997  | Hara et al.                            |
| 5,658,681 | A    | 8/1997  | Sato et al.                            |
| 6,309,768 | B1 * | 10/2001 | Patterson et al. ............... 429/13 |
| 2002/0009623 | A1 * | 1/2002 | St-Pierre et al. ............... 429/13 |
| 2002/0071975 | A1 * | 6/2002 | Shimazu ........................ 429/17 |
| 2002/0076582 | A1 * | 6/2002 | Reiser et al. .................. 429/13 |

FOREIGN PATENT DOCUMENTS

| JP | 61-88461   | 5/1986 |
| JP | 62-190661  | 8/1987 |
| JP | 1-117277   | 5/1989 |

(Continued)

*Primary Examiner*—Patrick Ryan
*Assistant Examiner*—Keith Walker
(74) *Attorney, Agent, or Firm*—Oblon, Spivak, McClelland, Maier & Neustadt, L.L.P.

(57) ABSTRACT

A purging apparatus for a fuel cell system according to the present invention comprises a steam supply pass 18 and an air supply pass 19. A purging method for the fuel cell system according to the present invention comprises, at a time of causing a fuel reformer 12, a fuel cell body 1 and a fuel supply line 13 to carry out the purging operation, first carrying out the purging operation by steam, and then carrying out the purging operation by air. According to such a structure, there can be provided the purging apparatus for the fuel cell system and the method therefor, which have an easy structure and an easy operation, and enables combustible gas and condensed water remaining in the system to be removed in a reliable manner.

1 Claim, 7 Drawing Sheets

FOREIGN PATENT DOCUMENTS

| | | |
|---|---|---|
| JP | 1-183073 | 7/1989 |
| JP | 4-10360 | 1/1992 |
| JP | 4-51469 | 2/1992 |
| JP | 8-119602 | 5/1996 |
| WO | WO 01/02296 A1 | 1/2001 |
| WO | 01/97312 | 12/2001 |

* cited by examiner

PURGING METHOD OF FUEL CELL SYSTEM

TECHNICAL FIELD

The present invention relates to a fuel cell system, which includes a purging apparatus for purging unreacted combustible gas from a fuel supply line, and a purging method therefor.

BACKGROUND OF THE INVENTION

A fuel cell system has recently been thrown as a high-efficiency energy conversion apparatus into the limelight.

Some types of the fuel system have been operated or under research and development. Of these systems, a proton-exchange membrane fuel cell system utilizing proton as electrolyte has a compact structure, and in addition, ensures high power density and can be operated in the form of a simple system, thus receiving attention in use not only as stationary distributed batteries, but also as power supply sources for space, vehicles and home use.

Figure 13:
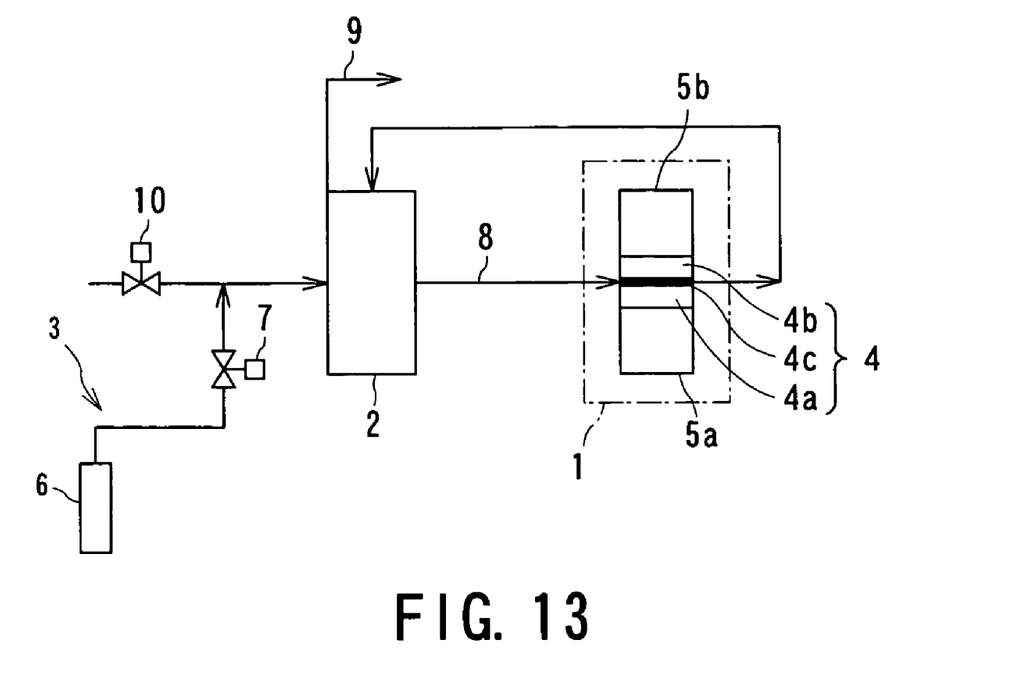
FIG. 13 is a schematic system diagram showing the conventional fuel cell system.

Such a highly expected fuel cell system, especially the proton-exchange membrane fuel cell system has a structure comprising a fuel cell body 1, a fuel reformer 2 and a purging line, as shown in FIG. 13.

The fuel cell body 1 is provided with a membrane electrode composite body in which a proton-conductive solid polymer membrane 4c is for example held between gas diffusion electrodes 4 with catalytic layers. Separators 5a, 5b serving as a collector, which have gas supply grooves and are formed of material having a low gas permeability, are alternatively placed in a stacked state on both the outer sides of the membrane electrode composite body.

The gas diffusion electrode 4 is provided on its one side with a fuel electrode 4a, and on the other side with an oxidizing electrode (an air electrode) 4b. Fuel gas mainly containing hydrogen and air are separately supplied into these electrodes through the gas supply grooves of the separators 5a, 5b.

At this stage, an oxygen ion generated from the oxidizing electrode 4b passes through the solid polymer membrane 4c to react with hydrogen in the fuel electrode 4a, thus emitting an electron. Such an emitted electron is utilized as a direct current electric power.

The fuel reformer 2, which generates fuel gas mainly containing hydrogen from hydrocarbon fuel such as city gas, reforms the hydrocarbon fuel into the fuel gas mainly containing hydrogen by making a chemical reaction of the city gas, from which sulfur contained therein has been removed utilizing a hydrogenation desulfurization, with the use of a catalyst, for example adding steam into it.

The purging line 3, which is provided with an inert gas (for example, nitrogen) supply equipment 6 and an inert gas valve 7, is connected to a downstream side of a fuel valve 10 of a fuel supply line 8. The purging line 3 acts to purge condensed water and unreacted hydrogen gas, which was generated during production of the above-mentioned direct current electric power and still remained, even after termination of operation, in the fuel cell body 1, the fuel reformer 2 and the fuel supply line 8, with the use of the inert gas supplied from the inert gas supply equipment 6 through the inert gas valve 7, and discharged exhaust outside from the system through an exhaust pipe 9.

In the conventional fuel cell system, the purging operation has been carried out in order to cope with an explosion accident due to the unreacted hydrogen and corrosion by the condensed water, in this manner.

In the conventional fuel cell system as shown in FIG. 13, the purging operation has been carried out, when the operation is halted, to purge combustible gas and condensed water outside from the system, with the use of inert gas such as nitrogen, taking into consideration explosibility due to the residual combustible gas caused by unreacted substance from the fuel supply line, corrosiveness of equipment and damage to catalyst with which the equipment is covered, which are caused by the residual condensed water, and deteriorated activity due to oxidation of the catalyst caused by oxygen gas.

However, the inert gas (for example, nitrogen gas) supply equipment has a complicated structure in system, a large size, an increased cost and an increased running cost, and further requires many incidental facilities, thus causing many kinds of inconveniences and problems.

The fuel cell system, which requires the nitrogen supply equipment, has hardly been accepted for home use, thus constituting an obstacle to application or expansion to the home.

An object of the present invention, which was made in view of these circumstances, is to provide a fuel cell system, which include a purging apparatus for reliably removing combustible gas and condensed water, which remain in the system, in a simple structure and an easy operative manner, and a purging method therefore.

DISCLOSURE OF THE INVENTION

In order to attain the aforementioned object, the fuel cell system according to the present invention comprises a fuel cell body, a fuel reformer, a fuel supply line provided between the fuel cell body and the fuel reformer, and a purging line, which is connected to the fuel reformer and comprises a steam supply line and an air supply line.

According to a preferred embodiment of the fuel cell system of the present invention, the above-mentioned steam supply line is equipped with a steam valve and a steam reservoir.

The above-mentioned steam valve comprises a timer circuit of setting a valve opening/closing time.

The above-mentioned fuel cell body may be provided with a cell voltage detector.

The above-mentioned air supply line is equipped with a blower and an air valve.

The above-mentioned air valve comprises a timer circuit of setting a valve opening/closing time.

The blower and the air valve of the above-mentioned air supply line may be provided with a timer circuit of setting a previously measured period of time required for steam to convert into condensed water.

In addition, there may be provided an intermittent signal generator, which intermittently opens or closes the air valve and intermittently operates the blower.

Further, according to the present invention, there is provided a fuel cell system, which comprises: a fuel cell body; a fuel reformer; a fuel supply line provided between the fuel cell body and the fuel reformer; a carbon monoxide converter (transformer) and a carbon monoxide selective oxidation device; and a purging line, which is connected to the fuel reformer and comprises a steam supply line and an air supply line. Each of the fuel reformer, the carbon monoxide converter and the carbon monoxide selective oxidation device is provided with a temperature detector in association with the steam supply line.

Each of the fuel reformer, the carbon monoxide converter and the carbon monoxide selective oxidation device is provided with a temperature detector in association with the air supply line.

Each of the fuel reformer, the carbon monoxide converter, the carbon monoxide selective oxidation device and the fuel cell body may be provided with a temperature detector, the fuel cell body may further comprise a cell voltage detector, and there may be provided a monitoring device for monitoring abnormalities of the temperature detector and the cell voltage detector.

Further, according to the present invention, there is provided a fuel cell system comprising: a fuel cell body; a fuel reformer; a fuel supply line provided between the fuel cell body and the fuel reformer; and a purging line, which is connected to the fuel reformer, the fuel reformer including a burner combustion chamber, as well as a burner combustion chamber-exhaust line and a purge release line.

The above-mentioned burner combustion chamber-exhaust line may include an exhaust pipe connected to an outlet side of a fuel valve of the fuel supply line and an exhaust valve provided in the exhaust pipe.

The above-mentioned purge release line may include a purge-releasing pipe connected to the fuel reformer and a purge-releasing valve provided in the purge-releasing pipe.

The above-mentioned purge-releasing pipe may be connected to the fuel cell body through a purge switching valve, and a fuel bypass line provided with a bypass valve is connected to the purge-releasing pipe.

Further, according to the present invention, there is provided a fuel cell system, which comprises: a fuel cell body; a fuel reformer; a fuel supply line provided between the fuel cell body and the fuel reformer; and a purging line, which is connected to the fuel reformer and comprises an air supply line, the air supply line comprising an air valve and a blower, as well as a nitrogen separation membrane provided between the air valve and the blower.

Further, in order to attain the aforementioned object, there is provided a purging method of the present invention for a fuel cell system, the method comprising the steps of, by utilizing the fuel cell system comprising a fuel cell body, a fuel reformer, a fuel supply line provided between the fuel cell body and the fuel reformer, and a purging line connected to the fuel reformer: subjecting the fuel reformer, the fuel cell body and the fuel supply line to a purging operation; first carrying out the purging operation to the fuel reformer, the fuel cell body and the fuel supply line by steam; and then, carrying out the purging operation thereto by air.

According to a preferred embodiment of the above-mentioned method, the purging operation by the steam is carried out by previously measuring a cell voltage value of the fuel cell body when combustible gas is reduced to a non-problematic level in safety and closing, when the cell voltage value reaches a previously measured value, a steam valve to terminate the purging operation.

The above-mentioned fuel cell system may further comprise a carbon monoxide converter and a carbon monoxide selective oxidation device; and the purging operation by the steam may be carried out by closing a steam valve to terminate the purging operation, when the respective minimum values of temperatures of the fuel reformer, the carbon monoxide converter and the carbon monoxide selective oxidation device approximate a condensation temperature of the steam.

The purging operation by the steam may be carried out by previously measuring a cell voltage value of the fuel cell body when combustible gas is reduced to a non-problematic level in safety and closing a steam valve utilizing a measuring time thereof to terminate the purging operation.

The fuel cell system may further comprise a carbon monoxide converter and a carbon monoxide selective oxidation device; and the purging operation by the air may be carried out by previously measuring a period of time at which the respective minimum values of temperatures of the fuel reformer, the carbon monoxide converter and the carbon monoxide selective oxidation device approximate a condensation temperature of the steam, driving a blower utilizing a measuring time thereof and opening an air valve to start the purging operation.

The purging operation by the air may be carried out by previously measuring a period of time at which the steam placed on catalyst of the fuel reformer converts into condensed water, driving a blower utilizing a measuring time thereof and opening an air valve to start the purging operation.

Upon subjecting the fuel reformer, the fuel cell body and the fuel supply line to a purging operation, the steps may comprise causing first the fuel reformer, the fuel cell body and the fuel supply line to carry out the purging operation by steam, then causing them to carry out the purging operation by air, and then causing them to carry out an intermittent purging operation in which an air valve intermittently opens or closes and a blower intermittently operates.

Further, according to the present invention, there is provided a purging method for a fuel cell system, the method comprising the steps of, by utilizing the fuel cell system comprising a fuel cell body, a fuel reformer, a fuel supply line provided between the fuel cell body and the fuel reformer, a carbon monoxide converter, a carbon monoxide selective oxidation device, and a purging line connected to the fuel reformer: then subjecting the fuel reformer, the fuel cell body and the fuel supply line to a purging operation by steam and then by air; monitoring, during either one of the purging operation by the steam and the purging operation by the air, abnormalities of temperature detectors provided respectively in the fuel reformer, the carbon monoxide converter and the carbon monoxide selective oxidation device; stopping the purging operation at a time of recognizing the abnormalities of the temperature detectors; and again carrying out the purging operation by the steam and by the air after solving a problem of the abnormalities.

Further, according to the present invention, there is provided a purging method for a fuel cell system, in which, by causing a fuel reformer, a fuel cell body and a fuel supply line, to carry out a purging operation, by utilizing gas remaining in a burner combustion chamber of the fuel reformer to carry out the purge operation.

Further, according to the present invention, there is provided a purging method for a fuel cell system, the method comprising the steps of, by utilizing the fuel cell system comprising a fuel cell body, a fuel reformer, a fuel supply line provided between the fuel cell body and the fuel reformer, and a purging line connected to the fuel reformer: subjecting the fuel reformer, the fuel cell body and the fuel supply line to a purging operation; supplying fuel and air into a burner combustion chamber of the fuel reformer to generate combustion gas; and utilizing the combustion gas generated to carry out the purging operation.

BEST MODE FOR CARRYING OUT THE INVENTION

Embodiments of the purging apparatus of the fuel cell system according to the present invention and the purging method will be described hereunder with reference to the accompanying drawings and reference numerals shown therein.

Figure 1:
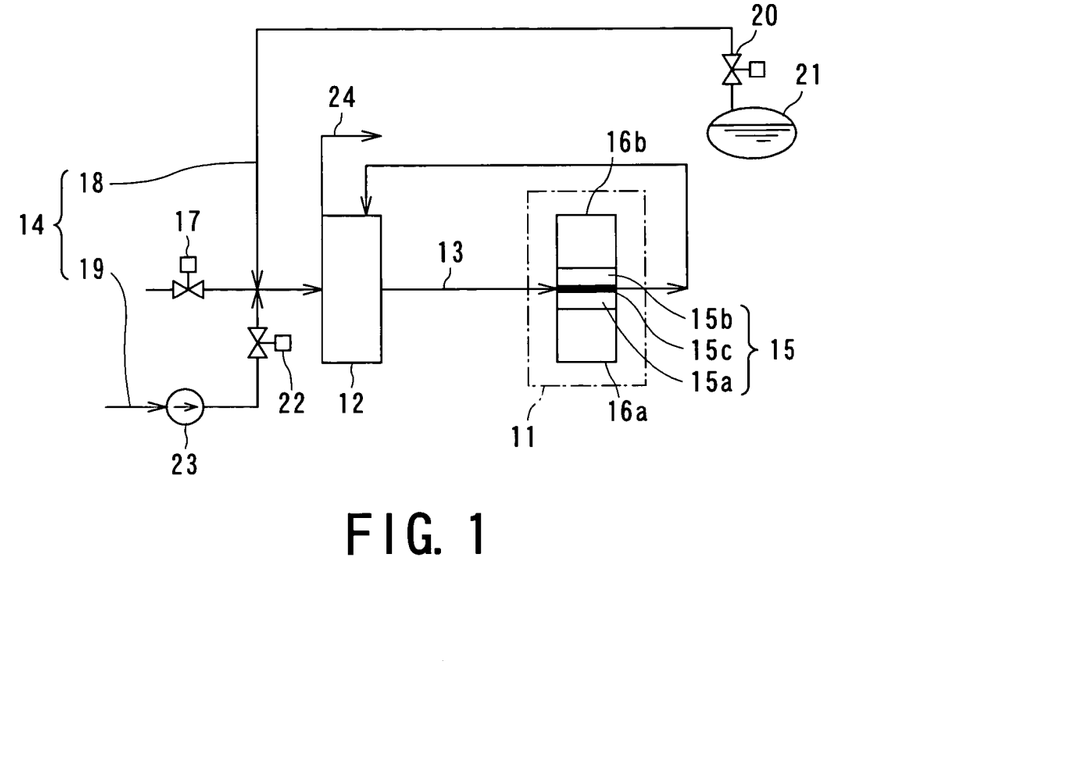
FIG. 1 is a schematic system diagram used for description of the first embodiment according to the present invention.

FIG. 1 is a schematic system diagram showing the first embodiment according to the present invention.

In the embodiment of the present invention, a purging line 14 is provided in a fuel cell body 11, a fuel reformer 12 and a fuel supply line 13.

The fuel cell body 11 is provided with a membrane electrode composite body in which a proton-conductive solid polymer membrane 5c is for example held between gas diffusion electrodes 15 with catalytic layers. Separators 16a, 16b serving as a collector, which have gas supply grooves and are formed of material having a low gas permeability, are alternatively placed in a stacked state on the both outer sides of the membrane electrode composite body.

The gas diffusion electrode 15 is provided on its one side with a fuel electrode 15a, and on the other side with an oxidizing electrode (an air electrode) 15b. Fuel gas mainly containing hydrogen and air are separately supplied into these electrodes through the gas supply grooves of the separators 16a, 16b.

At this stage, an oxygen ion generated from the oxidizing electrode 15b passes through a solid polymer membrane 15c to react with hydrogen in the fuel electrode 15a, thus emitting an electron. Such an emitted electron is utilized as a direct current electric power.

The fuel reformer 12, which generates fuel gas mainly containing hydrogen from hydrocarbon fuel such as city gas, reforms the hydrocarbon fuel into the fuel gas mainly containing hydrogen by making a chemical reaction of the city gas, from which sulfur contained therein has been removed utilizing a hydrogenation desulfurization, with the use of a catalyst, for example adding steam into it.

The purging line 14 is provided with a steam supply line 18 and an air supply line 19, which are connected to the downstream side of a fuel valve 17 of the fuel supply line 13. In the embodiment of the present invention, the fuel supply line 13 is a pipe, which is provided between the fuel cell body 11 and the fuel reformer 12. The purging operation is required in the fuel reformer 12, the cell body 11 and the fuel supply line 13 in the embodiment of the present invention.

The steam supply line 18 includes a steam valve 20 and a steam reservoir 21 for collecting for example the steam. The steam reservoir 21 may be for example a steam/liquid separator for separating steam contained in exhaust gas, which is generated from the fuel electrode 15a of the fuel cell body 11.

The air supply line 19 includes an air valve 22 and a blower 23.

Now, description will be given below of the purging method for the fuel cell body 11, the fuel reformer 12 and the fuel supply line 13.

The fuel cell system first opens the steam valve 20, after completion of the operation, and supplies the steam from the steam reservoir 21 to the fuel reformer 12 and the fuel cell body 11 through the steam supply line 18 and the fuel supply line 13 to purge fuel gas such as unreacted hydrogen and discharge exhaust outside from the system through an exhaust pipe 24 of the fuel reformer 12.

Then, the fuel cell system of the embodiment of the present invention opens the air valve 22 and drives the blower 23 to supply air so as to purge condensed water, which has still remained in the fuel reformer 12, the fuel supply line 13 and the fuel cell body 11, and discharge exhaust outside from the system through the exhaust pipe 24.

According to the embodiment of the present invention, the steam is supplied to each of the fuel cell body 11, the fuel reformer 12 and the fuel supply line 13 to purge the fuel gas such as the unreacted hydrogen remaining in these equipments, and then the condensed water, which has remained in the system, is purged by the air. It is therefore possible to make the equipments simple and remove the unreacted fuel gas and the condensed water in a reliable manner, thus providing a safe and stable operation of the fuel cell system.

Figure 2:
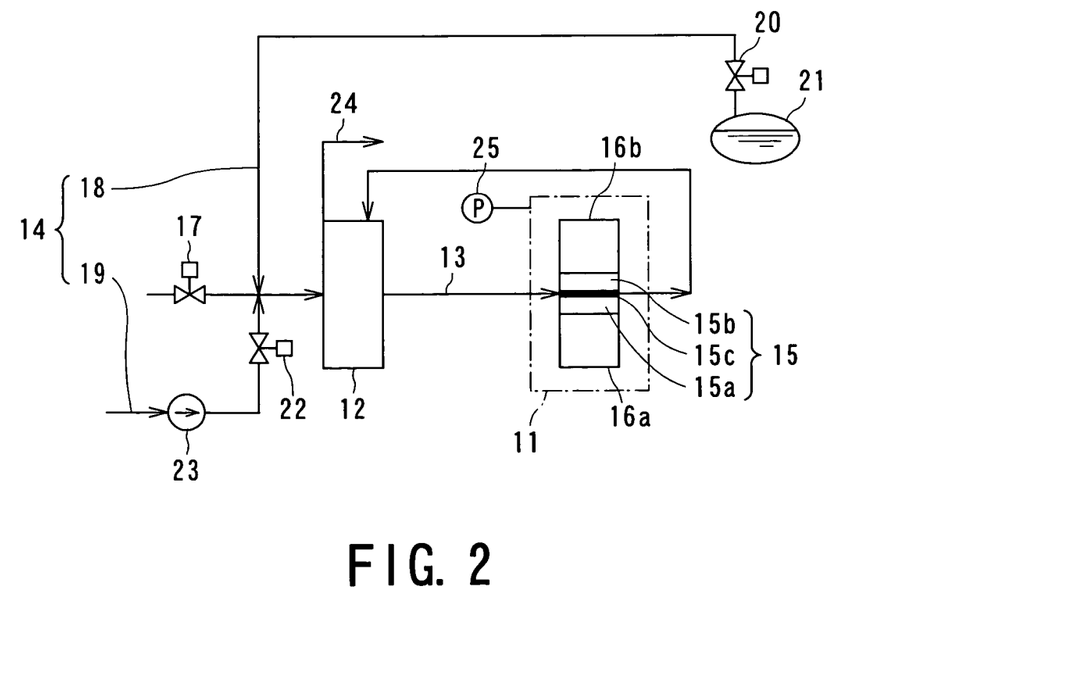
FIG. 2 is a schematic system diagram used for description of the second embodiment according to the present invention.

FIG. 2 is a schematic system diagram used for description of the second embodiment according to the present invention. The same structural components as the first embodiment have the same reference numerals.

In this embodiment of the present invention, a cell voltage detector 25 is provided in the fuel cell body 11 so as to detect a value of the unreacted fuel gas such as hydrogen gas, which has still remained in the fuel cell body 11 to thereby recognize the fact that an amount of the unreacted fuel gas reduces to a non-problematic level in safety. This makes it possible to switch the purging operation of the unreacted fuel gas by the steam to the purge operation of the condensed water by the air, when the cell voltage detector 25 detects a predetermined value. The other structural features are the same as those in the first embodiment and description thereof is therefore omitted.

According to this embodiment of the present invention, the purging operation of the unreacted fuel gas by the steam is switched to the purging operation of the condensed water by the air, after recognizing the fact that the cell voltage value is reduced to a non-problematic level in safety of the combustible gas by the cell voltage detector 25 of the fuel cell body 11. It is therefore possible to remove the unreacted fuel gas in a reliable manner, thus providing a safe and stable operation of the fuel cell system.

Figure 3:
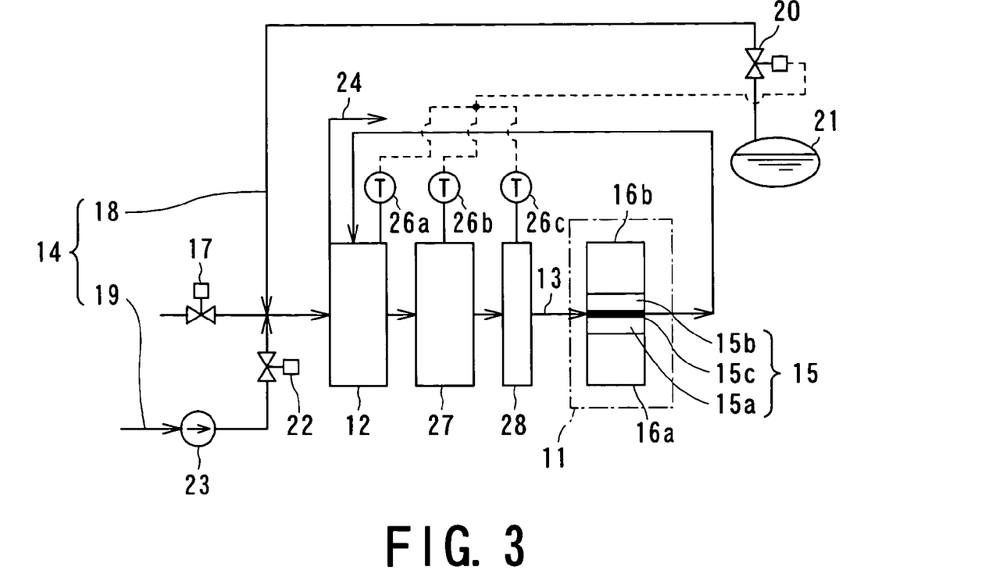
FIG. 3 is a schematic system diagram used for description of the third embodiment according to the present invention.

FIG. 3 is a schematic system diagram used for description of the third embodiment according to the present invention. The same structural components as the first embodiment have the same reference numerals.

In this embodiment of the present invention, a carbon monoxide converter (transformer) 27 and a carbon monoxide selective oxidation device 28 are provided between the fuel reformer 12 and the fuel cell body 11. At a time when the minimum values of the temperatures, which are detected by a temperature detector 26a provided in the fuel reformer 12, a temperature detector 26b provided in the carbon monoxide converter 27 and a temperature detector 26c provided in the carbon monoxide selective oxidation device 28, approximate a condensation temperature of the steam, the steam valve 20 is closed to terminate the purging operation of the unreacted fuel gas by the steam. The other structural features are the same as those in the first embodiment and description thereof is therefore omitted.

In this embodiment of the present invention, the carbon monoxide converter 27 is a reactor, which transforms the carbon monoxide generated in the fuel reformer 12 into carbon dioxide. A CO concentration especially in the proton-exchange membrane fuel cell must be decreased smaller than the conventional phosphoric-acid type fuel cell, and only the carbon monoxide converter is not suffice. In view of this fact, the carbon monoxide selective oxidation device 28 is a reactor, which decreases more remarkably a CO concentration. These reactors are provided separately from each other in the fuel supply line 13 serving as a piping. Accordingly, in an example in which they are incorporated, it can be said to be necessary to carry out the purging operation in the fuel reformer 12, the fuel cell body 11, the carbon monoxide converter 27, the carbon monoxide selective oxidation device 28 and the fuel supply line 13.

In this embodiment of the present invention, at a time when the purging operation of the unreacted fuel gas by the steam is switched to the purging operation of the condensed water by the air, there is recognized that the minimum values of the temperature detectors 26a, 26b, 26c, which are provided in the fuel reformer 12, the carbon monoxide converter 27 and the carbon monoxide selective oxidation device 28, respectively, approximate the condensation temperature of the steam, and then the steam valve 20 is closed to terminate the purging operation of the unreacted fuel gas by the steam. It is therefore possible to remove the unreacted fuel gas in a reliable manner, thus providing a safe and stable operation of the fuel cell system.

Figure 4:
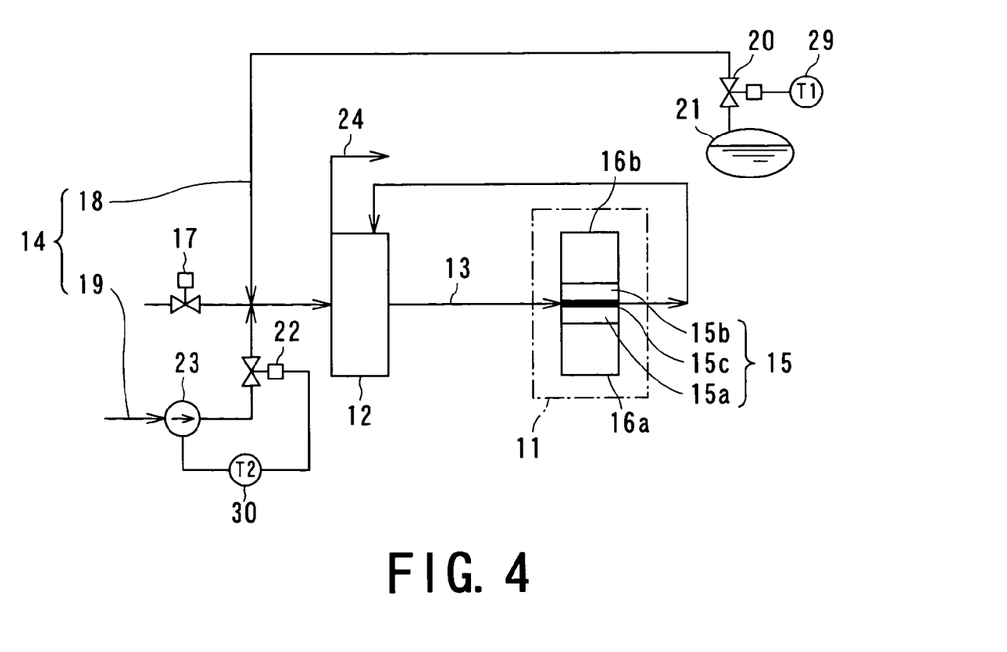
FIG. 4 is a schematic system diagram used for description of the fourth embodiment according to the present invention.

FIG. 4 is a schematic system diagram used for description of the fourth embodiment according to the present invention. The same structural components as the first embodiment have the same reference numerals.

Figure 12:
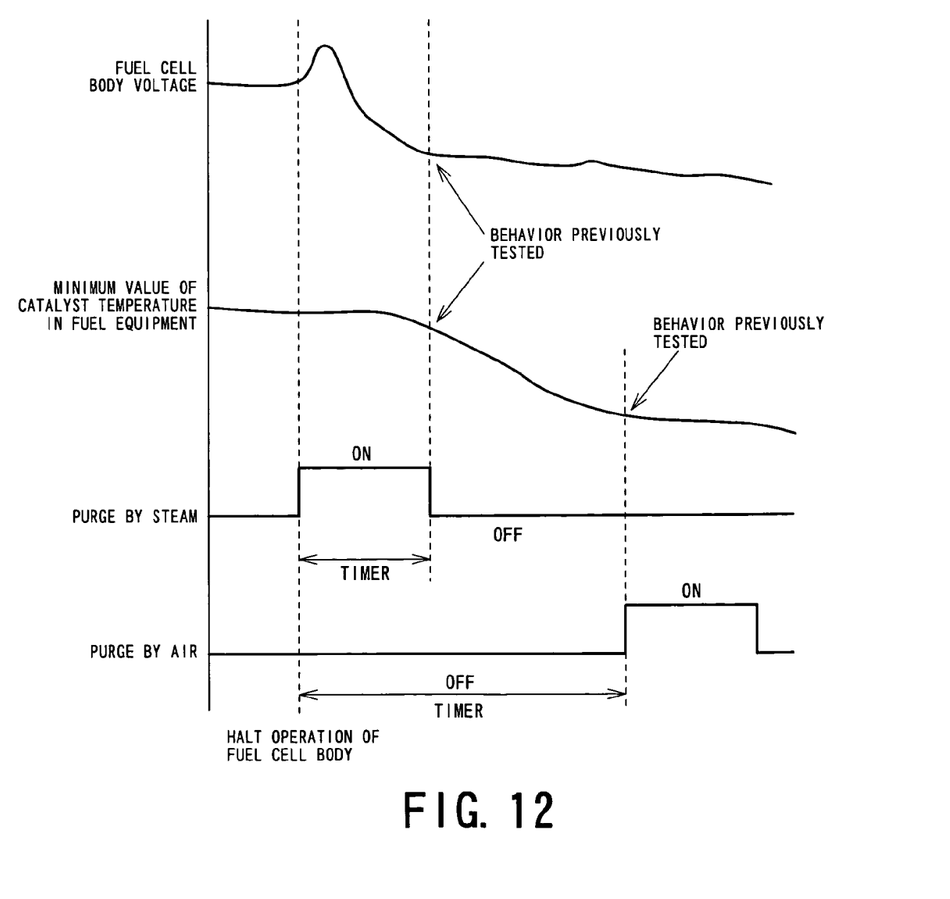
FIG. 12 is a graph of behavior lines showing a period of time in the cell voltage value, for which combustible gas reduces to a non-problematic level in safety, after terminating the operation of the fuel cell body, as well as a period of time for which a catalyst temperature of a fuel reformer is minimized after terminating the operation thereof to cause steam to approximate to a condensation temperature, when carrying out the purge operation by steam and the purge operation by air utilizing the fuel cell system.

In this embodiment of the present invention as shown in FIGS. 4 and 12, after halting the operation of the fuel cell body 11, the cell voltage detector 25 provided in the fuel cell body 11 previously measures a period of time for which the cell voltage value is reduced to a non-problematic level in safety of the combustible gas, a period of time for which the cell voltage reaches the above-mentioned value as previously measured, is set in the first timer circuit 29 provided in the steam valve 21 so as to open the steam valve 21 by the time as set, and on the one hand, a valve opening time, for opening the valve from the time when the minimum value of the above-mentioned catalyst temperature is coincident with the condensation temperature of the steam, is set in the second timer circuit 30 provided in the air valve 22 so as to open the air valve 22 from the time when the minimum value of the catalyst temperature is coincident with the condensation temperature of the steam. The other structural features are the same as those in the first embodiment and description thereof is therefore omitted.

According to this embodiment of the present invention, the period of time from the halting of the fuel cell body 11 to the opening of the valve and the period of time from the halting thereof to the closing of the valve are set in the first timer circuit 29 provided in the steam valve 21 and the second timer circuit 30 provided in the air valve 22, respectively, so that the steam valve 21 is opened to purge the unreacted fuel gas by the steam, and the air valve 22 is then opened to purge the condensed water by the air. It is therefore possible to remove the unreacted fuel gas and the condensed water in a reliable manner, thus providing a safe and stable operation of the fuel cell system.

Figure 5:
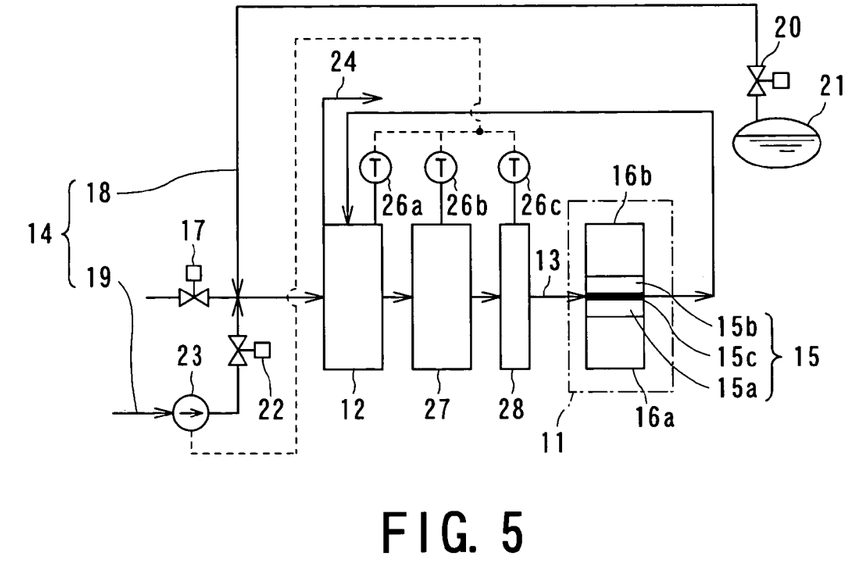
FIG. 5 is a schematic system diagram used for description of the fifth embodiment according to the present invention.

FIG. 5 is a schematic system diagram used for description of the fifth embodiment according to the present invention. The same structural components as the first and third embodiments have the same reference numerals.

In this embodiment of the present invention, at a time when the minimum values of the respective temperatures of the temperature detector 26a provided in the fuel reformer 12, the temperature detector 26b provided in the carbon monoxide converter 27 and the temperature detector 26c provided in the carbon monoxide selective oxidation device 28, approximate the condensation temperature of the steam, the blower 23 is driven and the air valve 22 is opened to start the purging operation of the condensed water by the air. The other structural features are the same as those in the first embodiment and description thereof is therefore omitted.

According to the embodiment of the present invention, upon switching the operation from the purging operation of the unreacted fuel gas by the steam to the purging operation of the condensed water by the air, the purging operation of the condensed water by the air is started after recognizing the fact that the minimum values of the respective temperatures of the temperature detectors 26a, 2b, 26c provided in the fuel reformer 12, the carbon monoxide converter 27 and the carbon monoxide selective oxidation device 28, respectively. It is therefore possible to remove the unreacted fuel gas in a reliable manner, thus providing a safe and stable operation of the fuel cell system.

Figure 6:
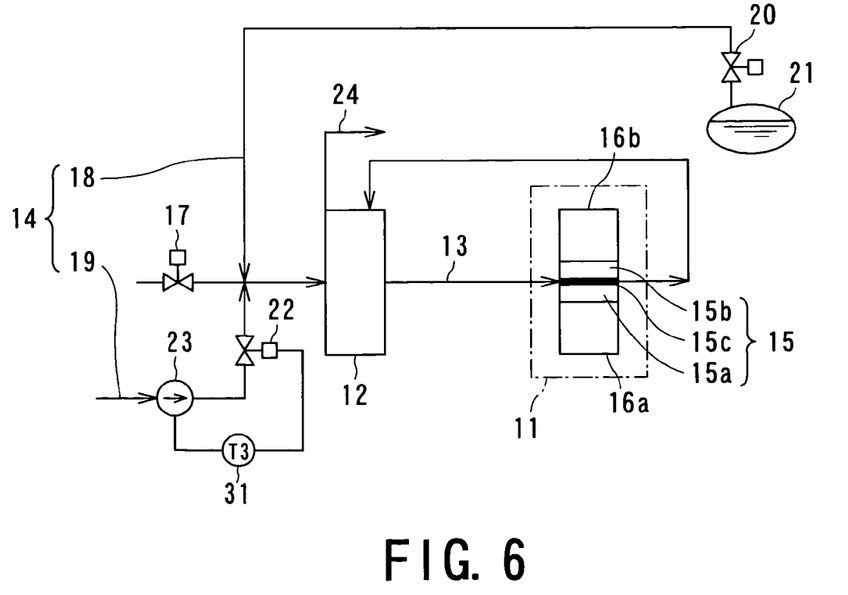
FIG. 6 is a schematic system diagram used for description of the sixth embodiment according to the present invention.

FIG. 6 is a schematic system diagram used for description of the sixth embodiment according to the present invention. The same structural components as the first embodiment have the same reference numerals.

In this embodiment of the present invention, it is considered that the changing of the temperature in an equipment, for example, the fuel reformer 12 to predetermined temperature causes the steam in the equipment to convert into the condensed water and that the decreasing in particular of the catalyst temperature of the fuel reformer to the minimum value generates the condensed water. There is previously measured a period of time, for which the temperature in the fuel reformer 12 reaches the predetermined temperature after the halting of the fuel cell body 12 to convert the steam placed on the catalyst into the condensed water. The thus measured period of time is set in the third timer circuit 31 provided in the blower 23 and the air valve 22, and the third timer circuit 31 is turned "ON" after the lapse of the above-mentioned measured period of time from the halting of the operation of the fuel cell body 11 to drive the blower 23 and open the air valve 22, thus starting the purging operation of the condensed water by the air, as shown in FIGS. 6 and 12. The other structural features are the same as those in the first embodiment and description thereof is therefore omitted.

According to this embodiment of the present invention, upon switching the operation from the purging operation of the unreacted fuel gas by the steam to the purging operation of the condensed water by the air, the timer circuit 31 is turned "ON", when, for example, the steam in the fuel reformer 12 is converted into the condensed water, to drive the blower 23 and open the air valve 22, thus starting the purging operation of the condensed water by the air. It is therefore possible to remove the unreacted fuel gas in a reliable manner, thus providing a safe and stable operation of the fuel cell system.

Figure 7:
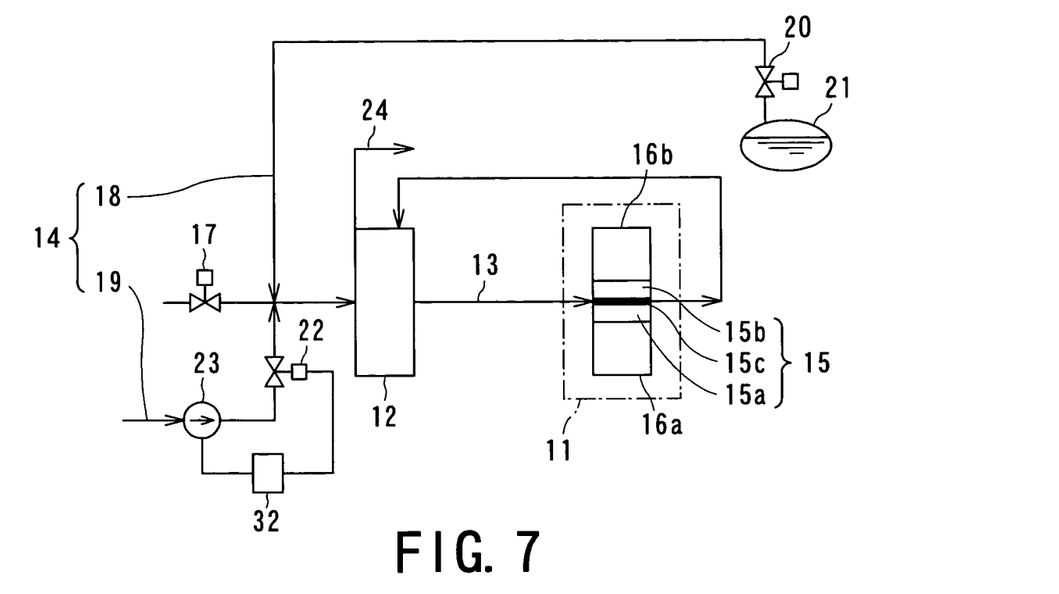
FIG. 7 is a schematic system diagram used for description of the seventh embodiment according to the present invention.

FIG. 7 is a schematic system diagram used for description of the seventh embodiment according to the present invention. The same structural components as the first embodiment have the same reference numerals.

In this embodiment of the present invention, it is considered that the steam remaining in the catalyst in the fuel reformer 12 after the purging operation of the unreacted fuel gas by the steam and the subsequent purging operation of the condensed water by the air is converted into the condensed water, the blower 23 is intermittently operated, and the air valve 22 is intermittently opened or closed.

Intermittent operation signals are supplied from an intermittent signal generator 32 for the intermittent operation of the blower 23 and the intermittent opening or closing of the air valve 22. The other structural features are the same as those in the first embodiment and description thereof is therefore omitted.

According to this embodiment of the present invention, the steam, which remains in the catalyst in the fuel reformer 12 after the purging operation of the unreacted fuel gas by the steam and the subsequent purging operation of the condensed water by the air can be prevented from being converted into the condensed water, the intermittent signal is supplied to the blower 23 to carry out the intermittent operation thereof, and the intermittently opening or closing signal is supplied to the air valve 22 to carry out the intermittent opening or closing operation, so as to apply the intermittent pressing force of air to the condensed water. Thus, the unreacted fuel gas is removed in a reliable manner, thus providing a safe and stable operation of the fuel cell system.

Figure 8:
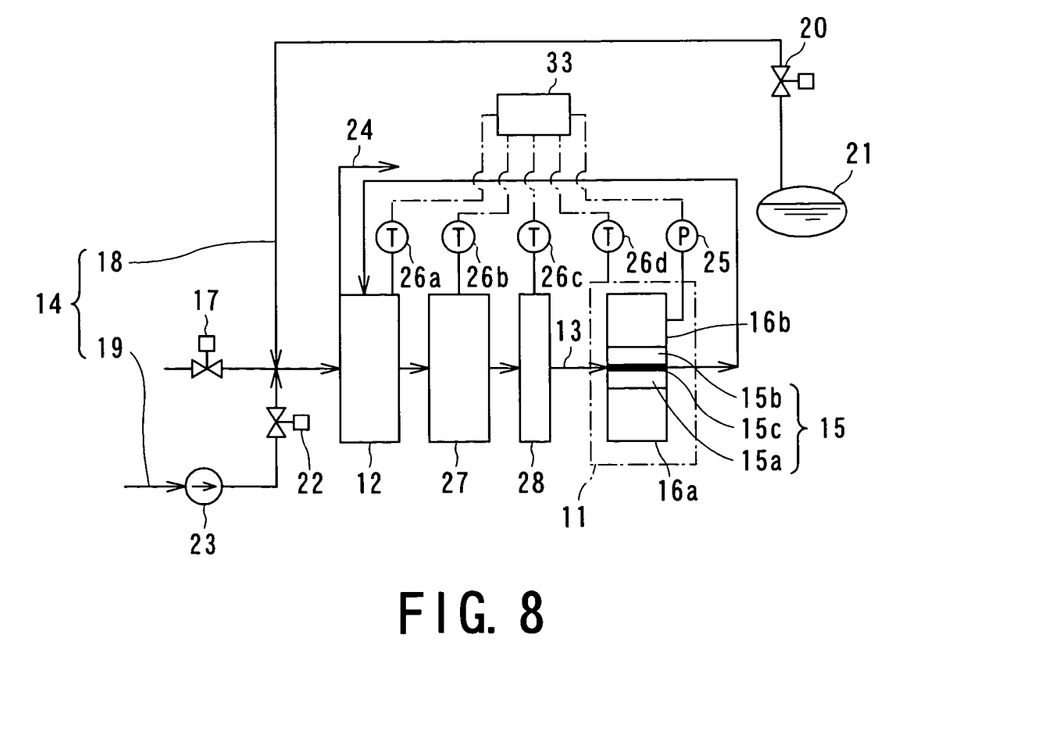
FIG. 8 is a schematic system diagram used for description of the eighth embodiment according to the present invention.

FIG. 8 is a schematic system diagram used for description of the eighth embodiment according to the present invention. The same structural components as the first and third embodiments have the same reference numerals.

In this embodiment of the present invention, a monitoring device 33 monitors the temperature detector 26a provided in the fuel reformer 12, the temperature detector 26b provided in the carbon monoxide converter 27, the temperature detector 26c provided in the carbon monoxide selective oxidation device 28, the temperature detector 26d provided in the fuel cell body 11, and the cell voltage detector 25, during any one of the purging operation of the unreacted fuel gas by the steam and the purging operation of the condensed water by the air, when there is recognized occurrence of a trouble due to abnormalities of at least one of them, such a trouble is removed, and then, at least one of the purging operation of the unreacted fuel gas by the steam and the purging operation of the condensed water by the air is repeated again. Providing the monitoring device 33 in the respective temperature detectors 26a to 26d makes it possible to detect the trouble in the respective temperature detectors 26a to 26d through an excessively increased temperature of the catalytic layer, even when the remaining combustible gas and the purging air may cause a combustion reaction to occur in the catalytic layer.

According to this embodiment of the present invention, it is possible to provide an ensured detection of troubles by monitoring each of the temperature detectors 26a to 26d by means of the monitoring device 33 so as to carry out repeatedly at least one of the purging operation of the unreacted fuel gas by the steam and the purging operation of the condensed water by the air, thus providing a safe and stable operation of the fuel cell system.

Figure 9:
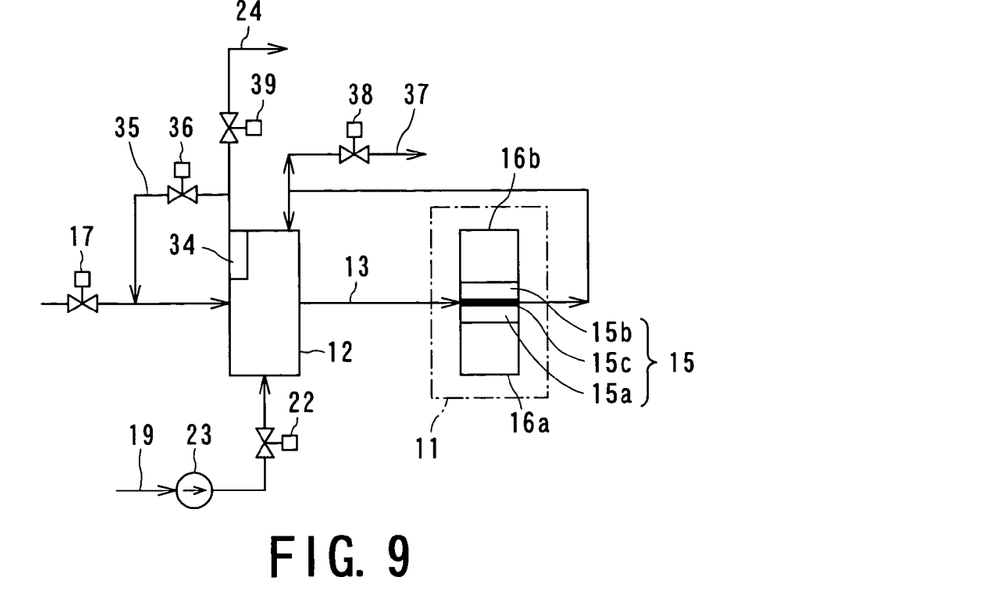
FIG. 9 is a schematic system diagram used for description of the ninth embodiment according to the present invention.

FIG. 9 is a schematic system diagram used for description of the ninth embodiment according to the present invention. The same structural components as the first embodiment have the same reference numerals.

In this embodiment of the present invention, the fuel reformer 12 is provided with a burner combustion chamber 34 so as to purge the condensed water, which remains in the fuel electrode 15a of the fuel cell body 11, with a gas, which remains in the burner combustion chamber 34 and is regarded as an inert gas. The air valve 33 is first opened after the halting of the operation of the fuel cell system, a burner combustion chamber exhaust valve 36 in a burner combustion chamber exhaust pipe 35, which branches off from an exhaust pipe 24 and is connected to an outlet side of the fuel valve 17 of the fuel supply line 13, is opened; a purge-releasing valve 38 in a purge-releasing pipe 37 is opened; an exhaust valve 39 in the exhaust pipe 24 is closed; and the blower 23 is then driven to supply the gas in the burner combustion chamber 34, which is regarded as the inert gas, to the burner combustion chamber exhaust valve 36, the fuel supply line 13 and the fuel electrode 15a of the fuel cell body 11 so that the condensed water remaining in the fuel electrode 15a is discharged outside from the system through the purge-releasing valve 38.

According to this embodiment of the present invention, the condensed water, which remains in the fuel electrode 15a of the fuel cell body 11, is purged outside from the system by the gas, which remains in the burner combustion chamber 34 of the fuel reformer 12 and is regarded as the inert gas. It is therefore possible to purge easily the condensed water remaining in the fuel electrode 15a outside from the system at a low cost, without specifically using an inert gas.

Figure 10:
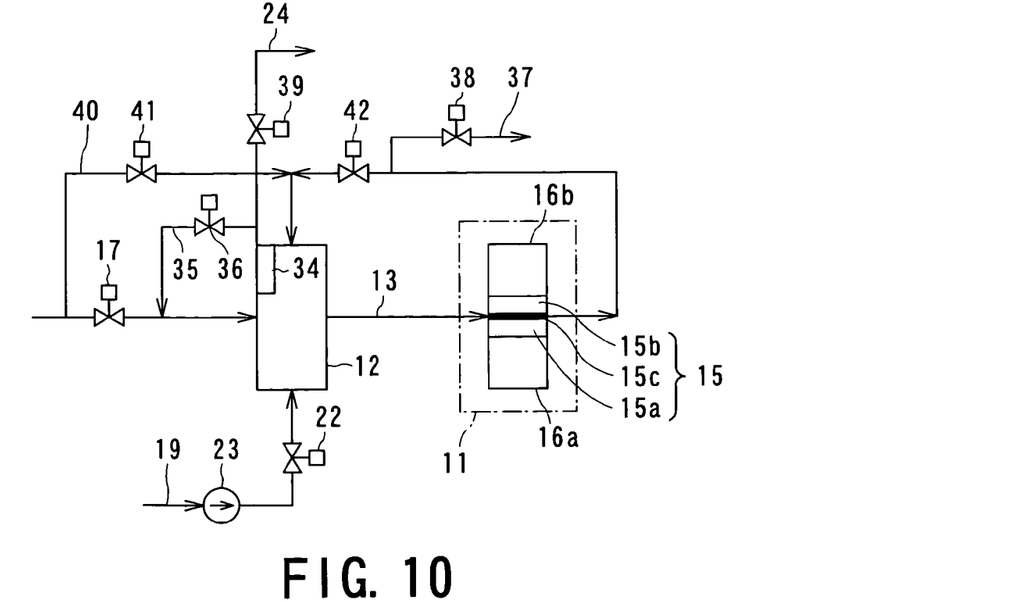
FIG. 10 is a schematic system diagram used for description of the tenth embodiment according to the present invention.

FIG. 10 is a schematic system diagram used for description of the tenth embodiment according to the present invention. The same structural components as the first and ninth embodiments have the same reference numerals.

In this embodiment of the present invention, the condensed water remaining in the fuel electrode 15a of the fuel cell body 11 is purged in view of the fact that a combustion gas, which has been generated by supplying the fuel from the fuel supply line 13 and the air from the air supply pass 19 into the burner combustion chamber 34, is regarded as the inert gas, and a bypass valve 41 in a fuel bypass line 40 is first opened after the halting of the operation of the fuel cell system. Then, the air valve 22 is opened; the burner combustion chamber exhaust valve 36 in the burner combustion chamber exhaust pipe 35 that branches off from the exhaust pipe 24 and is connected to the outlet side of the fuel valve 17 of the fuel supply line 13 is opened; the purge-releasing valve 38 in the purge-releasing pipe 37 is opened; a purge switching valve 42 and the exhaust valve 39 in the exhaust pipe 24 are closed; and then, the blower 23 is driven to generate the combustion gas, which is regarded as the inert gas, with the use of the air supplied from the blower 23 to the burner combustion chamber 34 and the fuel supplied from the fuel bypass line 40 to the burner combustion chamber 34 so that the thus generated combustion gas is supplied to the burner combustion chamber exhaust valve 36, the fuel supply line 13, and the fuel electrode 15a of the fuel cell body 11 to purge the condensed water remaining in the fuel electrode 15a outside form the system through the purge-releasing valve 38.

According to this embodiment of the present invention, the combustion gas, which is regarded as the inert gas, is generated in the burner combustion chamber 34 of the fuel reformer 12 and the condensed water remaining in the fuel electrode 15a is purged outside from the system by the thus generated combustion gas. It is therefore possible to purge easily the condensed water remaining in the fuel electrode 15a outside from the system at a low cost, without specifically using an inert gas.

Figure 11:
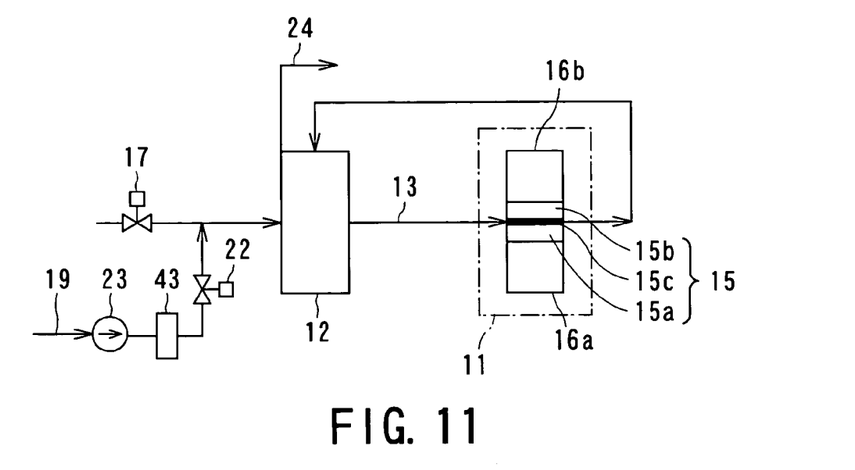
FIG. 11 is a schematic system diagram used for description of the eleventh embodiment according to the present invention.

FIG. 11 is a schematic system diagram used for description of the eleventh embodiment according to the present invention. The same structural components as the first embodiment have the same reference numerals.

In this embodiment of the present invention, a nitrogen separation membrane 43 is provided on the inlet side of the air valve 22 in the air supply system 19. The nitrogen separation membrane 43 extracts only nitrogen from the air to provide a pressing force of the nitrogen so as to purge the condensed water remaining in the fuel electrode 15a of the fuel cell body 11 outside from the system.

According to this embodiment of the present invention, the condensed water remaining in the fuel electrode 15a is purged outside from the system by the nitrogen extracted from the air by means of the nitrogen separation membrane 43. It is therefore possible to purge easily the condensed water remaining in the fuel electrode 15a outside from the system at a low cost, without specifically using an inert gas.

INDUSTRIAL APPLICABILITY

According to the purging apparatus of the fuel cell system of the present invention as described above and the method therefor, there is provided the purging line, which branches off from the fuel supply line and includes the two lines of the steam supply line and the air supply line so that the steam is supplied from the steam supply line to the fuel supply line, the fuel reformer and the fuel cell body to purge the combustible gas remaining in the system outside therefrom, and then, the air is supplied from the air supply line to the fuel supply line and the other to purge the condensed water remaining in the system outside therefrom. It is therefore possible to make the equipments simple and remove the unreacted fuel gas and the condensed water in a reliable manner, thus providing a safe and stable operation of the fuel cell system.

The invention claimed is:

1. A purging method for a fuel cell system including a fuel cell body, a fuel reformer, a fuel supply line provided between the fuel cell body and the fuel reformer, and a purging line connected to the fuel reformer, the method comprising the steps of:

subjecting the fuel reformer, the fuel cell body, and the fuel supply line to a steam purging operation such that the fuel reformer, the fuel cell body, and the fuel supply line are purged with steam to remove combustible gas; and then performing an air purging operation to remove any remaining combustible gas not removed by the steam purging operation, wherein the steam purging operation further comprises measuring a cell voltage value of the fuel cell body indicating a level of the remaining combustible gas, and before performing the air purging operation, closing a steam valve to terminate the steam purging operation, when the measured cell voltage value reaches a predetermined value indicating that the level of the combustible gas is reduced to a non-problematic safety level.

* * * * *

UNITED STATES PATENT AND TRADEMARK OFFICE
CERTIFICATE OF CORRECTION

| | | |
|---|---|---|
| PATENT NO. | : 7,687,162 B2 | Page 1 of 1 |
| APPLICATION NO. | : 10/470779 | |
| DATED | : March 30, 2010 | |
| INVENTOR(S) | : Sanagi et al. | |

It is certified that error appears in the above-identified patent and that said Letters Patent is hereby corrected as shown below:

On the title page, Item (87), the PCT information is incorrect. Item (87) should read:

--(87) PCT No.: WO/2002/061870

PCT Pub. Date: Aug. 8, 2002--

Signed and Sealed this

Eighth Day of June, 2010

David J. Kappos
*Director of the United States Patent and Trademark Office*